(12) United States Patent
Chung et al.

(10) Patent No.: US 7,200,391 B2
(45) Date of Patent: Apr. 3, 2007

(54) CAPACITY ENHANCEMENT SCHEMES FOR FORWARD AND REVERSE LINKS OF DISTRIBUTED CELLULAR BASE STATIONS

(75) Inventors: Sae-Young Chung, Tewksbury, MA (US); M. Vedat Eyuboglu, Concord, MA (US); Yong Hoon Kang, Seoul (KR); Dae-Young Kim, Lexington, MA (US); Jin Hwa Ku, Seoul (KR); Seung Hee Lee, Seoul (KR); Michael D. Pollman, Londonderry, NH (US)

(73) Assignees: Airvana, Inc., Chelmsford, MA (US); Solid Technologies, Inc., Seoul (KR)

( * ) Notice: Subject to any disclaimer, the term of this patent is extended or adjusted under 35 U.S.C. 154(b) by 560 days.

(21) Appl. No.: 10/313,931

(22) Filed: Dec. 6, 2002

(65) Prior Publication Data

US 2004/0110534 A1 Jun. 10, 2004

(51) Int. Cl.
*H04Q 7/20* (2006.01)
*H04B 1/38* (2006.01)
*H04M 1/00* (2006.01)

(52) U.S. Cl. .................................. 455/423; 455/561
(58) Field of Classification Search ............... 455/560, 455/561, 562.1, 550.1, 423–425, 67.11, 67.14, 455/67.16
See application file for complete search history.

(56) References Cited

U.S. PATENT DOCUMENTS

| | | | | |
|---|---|---|---|---|
| 5,768,685 | A * | 6/1998 | Patel et al. | 455/13.3 |
| 5,805,983 | A * | 9/1998 | Naidu et al. | 455/67.16 |
| 5,982,824 | A * | 11/1999 | Ann | 375/345 |
| 6,005,884 | A * | 12/1999 | Cook et al. | 375/132 |
| 6,058,317 | A * | 5/2000 | Posti | 455/561 |
| 6,308,065 | B1 * | 10/2001 | Molinari et al. | 455/424 |
| 6,411,825 | B1 * | 6/2002 | Csapo et al. | 455/561 |
| 6,459,909 | B1 * | 10/2002 | Bilcliff et al. | 455/562.1 |
| 6,618,599 | B1 * | 9/2003 | Son et al. | 455/561 |
| 6,785,558 | B1 * | 8/2004 | Stratford et al. | 455/561 |
| 6,889,047 | B2 * | 5/2005 | Ishida | 455/450 |
| 2004/0235511 | A1 * | 11/2004 | Nakao | 455/522 |

* cited by examiner

*Primary Examiner*—Nguyen T. Vo
(74) *Attorney, Agent, or Firm*—Fish & Richardson P.C.

(57) ABSTRACT

Capacity enhancement schemes are described for forward and reverse links of distributed cellular base stations consisting of a central unit and one or more remote units. In general, in one aspect, reverse link capacity is shared among remote units. The capacity sharing can be determined dynamically. The forward link capacity can also be enhanced by estimating the location of the mobile stations.

19 Claims, 6 Drawing Sheets

CAPACITY ENHANCEMENT SCHEMES FOR FORWARD AND REVERSE LINKS OF DISTRIBUTED CELLULAR BASE STATIONS

TECHNICAL FIELD

This invention relates to capacity enhancement schemes for forward and reverse links of distributed cellular base stations.

For clarity, the following acronyms are used throughout this specification:

| | |
|---|---|
| 1xEV-DO | 1xEV-Data Only |
| 1xEV-DV | 1xEV-Data and Voice |
| ADC | Analog to Digital Converter |
| AGC | Automatic Gain Control |
| AN | Access Network |
| BS | Base Station |
| BSC | Base Station Controller |
| CDM | Code Division Multiplexing |
| CDMA | Code Division Multiple Access |
| CDMA-2000 | A CDMA standard supporting voice and data |
| CU | Central Unit |
| DAC | Digital to Analog Converter |
| DDC | Digital Down Converter |
| DUC | Digital Up Converter |
| E/O | Electrical to Optical Converter |
| FDM | Frequency Division Multiplexing |
| FDMA | Frequency Division Multiple Access |
| FL | Forward Link |
| GPS | Global Positioning System |
| IF | Intermediate Frequency |
| IS-95 | A CDMA standard supporting voice |
| LNA | Low Noise Amplifier |
| MS | Mobile Station |
| O/E | Optical to Electrical Converter |
| OFDM | Orthogonal Frequency Division Multiplexing |
| PA | Power Amplifier |
| PN | Pseudorandom Noise |
| RE | RF Element |
| RF | Radio Frequency |
| RL | Reverse Link |
| ROT | Rise-Over-Thermal |
| RU | Remote Unit |
| SE | Sector Element |
| SNR | Signal-to-Noise Ratio |
| SSNR | Signal-to-Signal-plus-Noise Ratio |
| TDM | Time Division Multiplexing |
| TDMA | Time Division Multiple Access |
| WCDMA | Wide band CDMA |
| WDM | Wavelength Division Multiplexing |

BACKGROUND

Cellular wireless communication systems are designed to serve many MS's distributed in a large geographic area by dividing the area into cells. At the center of each cell, a BS is located to serve MS's in the cell. Each cell can be further divided into sectors by using multiple sectorized antennas. Typically three sectors per cell are used. The term sector is used, however, even when there is only one sector per cell. In each cell, a BS serves one or more sectors and communicates with multiple MS's in its cell. The communication between the BS and the MS uses analog modulation (such as analog voice) or digital modulation (such as digital voice or digital packet data) to transmit and receive such data (analog or digital).

In cellular wireless systems, a BS includes devices needed to transmit and receive signals to and from MS's, which typically include modems, up/down converters, ADC's, DAC's, filters, LNA's, power amplifiers, and transmit and receive antennas. A BS also has devices to transmit and receive MS's signals and other control signals to and from other systems such as a base station controller that controls multiple BS's.

A certain amount of bandwidth (radio spectrum) is used for such communication between the BS and the MS. Two separate spectrums can be allocated for the forward link (from the BS to the MS) and for the reverse link (from the MS to the BS) or one spectrum can be time division multiplexed to carry traffic in both directions. The minimum unit of bandwidth needed in a cellular wireless system can be referred to as a carrier. As the amount of data traffic is increased, the number of carriers needs to be increased and/or more BS's need to be installed between existing BS's.

A carrier in a sector can handle up to a certain amount of data traffic, which is referred to as the capacity per carrier per sector or simply capacity. In general, the capacity is different in the forward and in the reverse links.

In a conventional known BS, all functions are implemented in BS. Therefore, the BS becomes a big box to support multiple carriers and sectors, and it occupies a big floor space in the cell site. In another conventional known BS, for a backhaul to a BSC, usually a leased line such as T1/E1 is used. In another conventional known RAN (Radio Access Network) using leased T1/E1 as backhaul, the link between a BSC and a BS is point-to-point STAR configuration. Since a leased line is usually charged per distance, this STAR structure is far more costly than a TREE structure where the total link distance can be greatly saved.

The number of MS's and the amount of data traffic MS's transmit or receive in a cell can vary significantly over time (e.g., heavy traffic during the day in an office area vs. heavy traffic during weekends and evenings in a residential area). It can be costly to have a BS with enough capacity to meet the peak demand. In some cases, the coverage area of a sector does not have enough traffic but still needs the resources of a sector. In this case, it is a waste of a capacity to allocate a sector capacity to a BS.

SUMMARY

An object of the invention is to increase forward and/or reverse link capacity of a cellular wireless system where base stations are distributed. Another object is the dynamic allocation of capacity to each sector based on actual demand, which reduces the total capacity requirement. Another object is to share capacity among multiple BS's.

In one aspect, there is a distributed base station having a central unit, one or more remote units, and one or more combining modules. The central unit has one or more modems. Each modem has one or more input ports. At least one of the remote units is in communication with the central unit via a transmission medium and the remote units each have one or more RF elements. Each RF element has one or more receive antennas. The combining module is configured to select one or more subsets of reverse link signals from the RF elements to be combined before an input port of the modem. More than one of the RF elements share a reverse link capacity of at least one of the modems.

The base station can further include a gain compensation module. The gain compensation module is configured to compensate signal paths associated with each of the selected subsets to equalize reverse link gains of the signal paths. The gain compensation module can be further configured to measure an amplified signal power while a test signal is injected at an input of a first RF element. The gain compensation module can be further configured to employ a temperature dependent variable gain device.

The base station can further include a switch. The switch is configured to disconnect the input of a RF element from an associated antenna and to connect the input to a first end of a resistor with its second end connected to a ground reference.

The test signal can include thermal noise across the resistor. The base station can also further include a test device configured to generate the test signal, wherein the amplified signal power is constant.

The base station can also include one or more additional features. The combining module can be further configured to dynamically change the mapping from the subsets of signals to each input port of the modem based on changes to the estimated loading in each RF element. Some of the RF elements can share the reverse link capacity of at least one of the modems and which RF elements share the capacity can change dynamically as an estimated loading in each RF element changes. Timing advance can be used to compensate for transmission delay from the central unit to a RF element that is not sharing.

Timing advance can also be used to compensate for transmission delay from the central unit to a RF element farthest from the central unit that is sharing the reverse link capacity of at least one of the modems with other RF elements. In this case, delay compensation is used in other RF elements to equalize forward and reverse link delays. Optimal delay compensation and timing advance are used as a function of cell size and RF environment in RF elements sharing the reverse link capacity of at least one of the modems.

In the base station at least a portion of the remote units can be cascaded. The cascading of the remote units can be done by TDM. At least a portion of signals can be combined at remote units. At least a portion of signals can be combined at the central unit. The signals transmitted between the central unit and a first remote unit can be analog or digital base band signals. The signals transmitted between the central unit and a first remote unit can also be analog or digital IF signals. The signals transmitted between the central unit and a first remote unit can be RF signals. At least a portion of the RF elements can support beam forming.

In another aspect, there is a method that includes generating, by a central unit, a signal associated with a mobile station. The method also includes determining a first RF element associated with the mobile station based on an estimated location of the mobile station and transmitting the signal to the first RF element, wherein the first RF element is included in remote units located separate from the central unit The method can include other additional features. The method can include detecting received signal energy from each remote unit when reverse link signals from the remote units are transmitted independently to the central unit. The signal transmission can be in accordance with CDMA. The method can include receiving a set of sectors included in a route update message from the mobile station and determining which remote unit is closest to the mobile unit based on the set of sectors.

The method can also include transmitting a forward link signal to each of the remote units and detecting a response signal from the mobile station. The response signal can include an ACK. In a system wherein the remote units comprise RF elements, the method can also include supporting, by at least a portion of the RF elements, beam forming.

In another aspect, there is a base station including RF elements and a central unit. The central unit is located separate from the RF elements. The central unit includes a modem and a selection module. The selection module is configured to determine a first RF element associated with a mobile station based on an estimated location of the mobile station. More than one RF element can share a forward link capacity of the modem.

In another aspect, there is distributed base station including a central unit, one or more remote units, and a selection module. The central unit has one or more modems. At least one of the remote units is in communication with the central unit via a transmission medium. Each remote unit has one or more RF elements. The selection module is configured to determine a first RF element associated with a mobile station based on an estimated location of the mobile station. More than one RF element in the remote units share a forward link capacity of at least one of the modems.

The distributed base station can include additional features. The selection module can be further configured to detect a received signal energy of the mobile station from each of the remote units when reverse link signals from the remote units are transmitted independently to the central unit. The base station can employ CDMA. In such a case, the selection module can be further configured to receive a set of sectors included in a route update message from the mobile station and to determine which remote unit is closest to the mobile unit based on the set of sectors. The selection module can be further configured to transmit a forward link signal to each of the remote units and to detect a response signal from the mobile station. At least a portion of RF elements can support beam forming.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

The example embodiments described below employ a CDMA air interface, such as IS-95, 1×EV-DO, CDMA2000 unless otherwise stated. However, the same principle can be applied to other air interfaces such as TDMA, OFDM, and the like. As a brief outline, the examples below first give an overview of an example system architecture. Then the examples describe how the architecture provides a TREE structure configuration using cascading capability. The examples further describe how the architecture can be deployed to aggregate backhaul to a BSC. The examples also describe sector sharing. The sector sharing description includes how to deliver a RL signal from a RU to a CU, including in one embodiment, adding a signal at a RU to save backhaul bandwidth. The sector sharing description also includes gain compensation. The examples also describe delay compensation.

Figure 1:
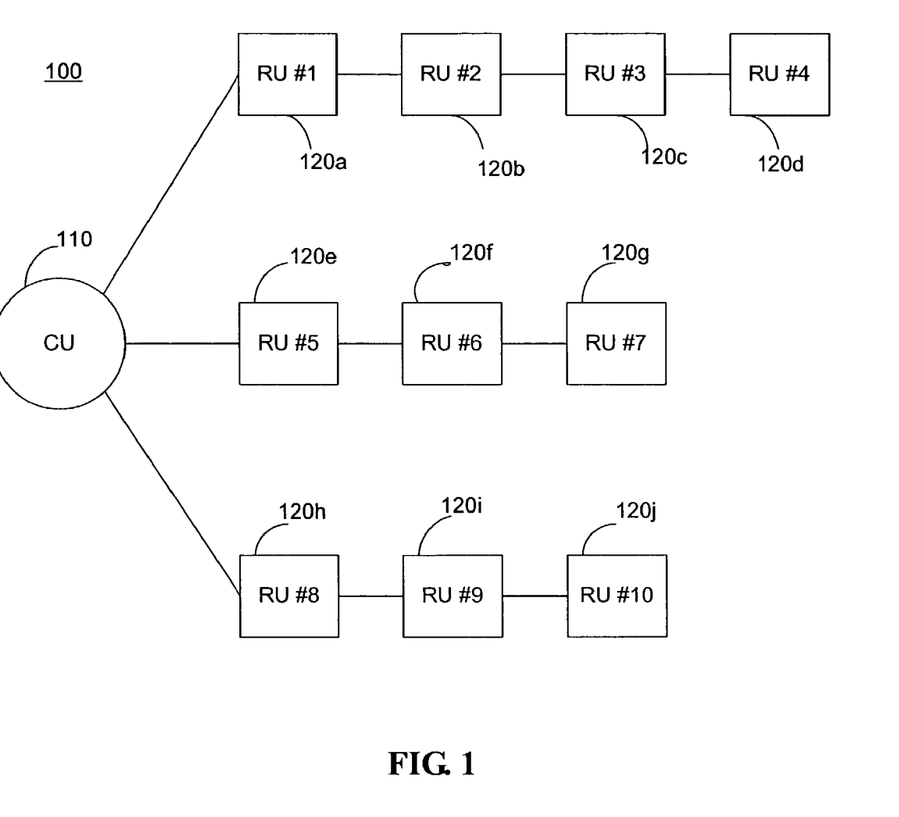
FIG. 1 is a block diagram of an embodiment of a distributed base station.

FIG. 1 illustrates an embodiment of a system 100 where multiple BS's are configured as a central unit 110 and one or more remote units 120a, 120b, 120c, 120d, 120e, 120f, 120g, 120h, 120i, and 120j, generally 120. All RU's 120 can be connected to the CU 110 directly, or through other RU's 120 as shown in FIG. 1. Functions of a conventional BS can be split among the CU 110 and the RU 120. There are many ways to divide functions between the CU 110 and the RU 120. For example, an interface to the BSC, a modem (generating forward link baseband signals and decoding bits from received baseband signals) and the like can be included in the CU 100. A baseband to RF conversion (e.g., also referred to as a RF chain), a PA, and the like can be included in a RU 120. In another example embodiment, the interface to the BSC, the modem, and the RF chain is included in the CU 110 and the PA is in a RU 120. The examples described herein employ the first example. So, for example, a RU 120 contains transmit and receive antennas, amplifiers, filters, up/down converters to convert signals between RF (e.g., at the antenna) and base band. The base band signals and other control signals can be transmitted to and from the CU 110 over a transmission medium that can comprise optical links, electrical links, wireless links, or other means. The examples described herein employ an optical link (e.g., dark fiber).

Figure 2:
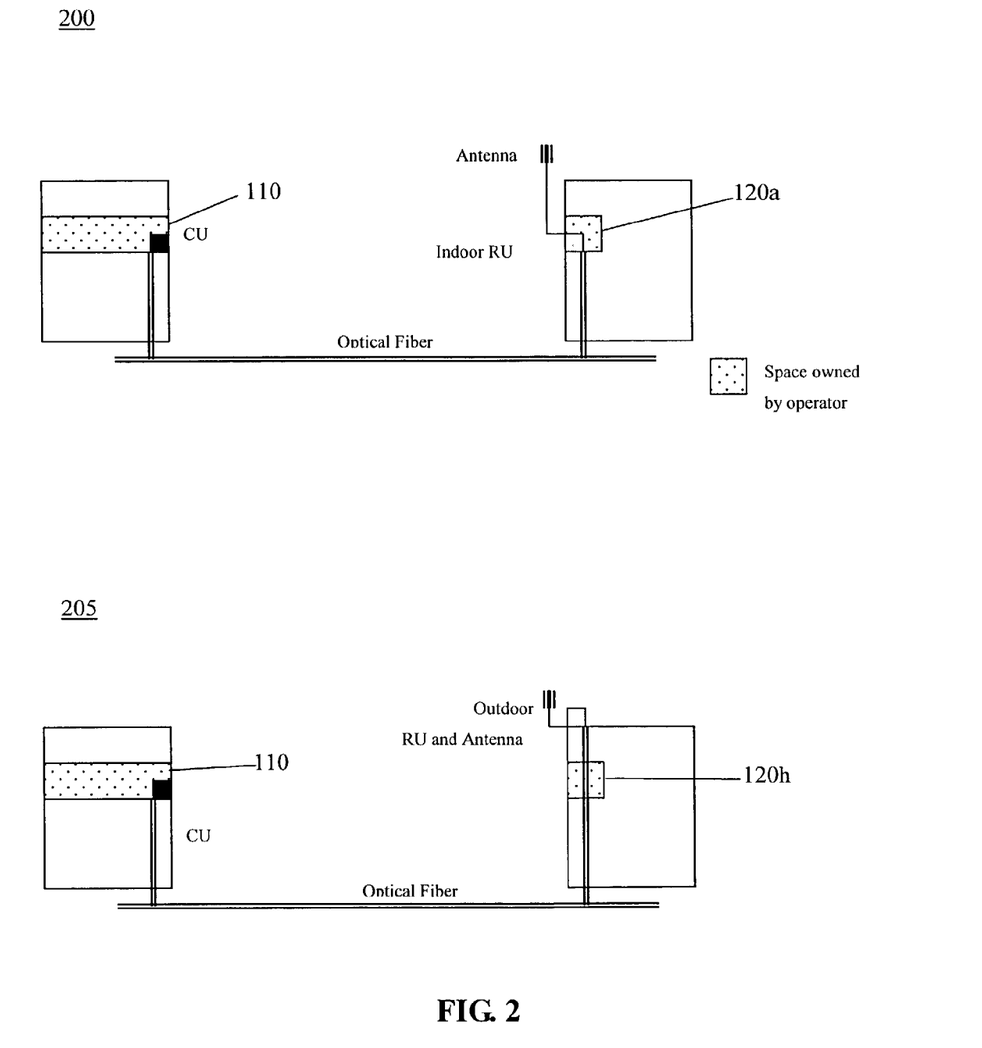
FIG. 2 is a block diagram of another embodiment of a distributed base station.

FIG. 2 shows example deployment scenarios 200 and 205 for a BS based on a CU (e.g., 110) and RU (e.g., 120a, 120h). In the first deployment scenario 200, the RU 120a is located indoors. In the second deployment scenario 205, the RU 120h is located outdoors. As illustrated, only the RU (e.g., 120a, 120h) needs to be at the cell site and CU 110 can be at the cell site or at some other location where the space is not a problem. Note that a RU 120 can be made smaller than a conventional BS since some BS functionality is implemented in CU 110. This enables a provider to save cell site space, which is an important factor for dense urban deployment.

A CU 110 can contain a modem (e.g., implemented in multiple boards called a modem card) that consists of one or more sector elements, where one SE can process signals for one sector and one carrier. Centralizing modems in one place enables dynamic and flexible sharing of the total modem capacity among RU's 120, as described in more detail below. Similarly as in a conventional BS, a RU can support sectorization and multiple RF carriers.

As described below, other embodiments not included as examples are also contemplated. For example, the examples employ digital transmission over the dark fiber between the CU 110 and the RU's 120. However, other medium (such as coaxial cable, wireless link, etc.) and/or other transmission scheme such as analog transmission can be also used. Similarly, the examples illustrate a baseband signal sent from the CU 110 to a RU 120. However, other signal such as RF or IF signals can be transmitted over the fiber too. Similarly, the examples illustrate a single carrier signal sent over the fiber, but other signals such as a multicarrier signal, added together in IF or RF frequency, can be sent over the fiber. The CU 110 can be located at a central location instead of cell site and dark fiber can be used between CU 110 and RU 120, saving backhaul cost if leasing dark fiber is cheaper than leasing T1/E1, which is the case in many situations.

Referring back to FIG. 1, the system 100 illustrates an example of a CU 110 and RU 120 configuration representing a TREE architecture, including cascading and fanning elements. In this example, RU #1 120a, #5 120e, and #8 120h are directly connected to the CU 110 and the other RU's 120b, 120c, 120d, 120f, 120g, 120i and 120j are connected to other RU's 120a, 120 e and 120h by cascading to reduce the total physical length of links.

Figure 3:
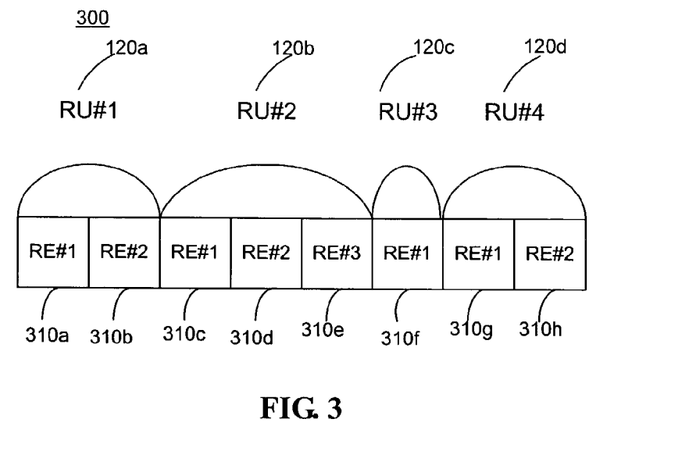
FIG. 3 is a block diagram of an embodiment of RF elements distributed among remote units.

The cascading capability can be provided using TDM and/or WDM to multiplex multiple RU's 120 signal. FIG. 3 illustrates an embodiment 300 employing TDM. As illustrated, there are 8 time slots. Each RU 120 includes one or more RE's (generally referred to as 310), where a RE 310 is a RF subsystem in a RU 120 that supports one sector and one carrier. In FIG. 3, eight sectors are allocated across four RU's 120. RU #1 120a includes a first RE 310a and a second RE 310b. RU #2 120b includes a first RE 310c, a second RE 310d and a third RE 310e. RU #3 120c includes a first RE 310f. RU #4 120d includes a first RE 310g and a second RE 310h. The example shows each time slot carries one RE's 310 signal. In the forward direction (from the CU 110 to the RU's 120), each RU 120 takes signals addressed to it. In the reverse direction (from RU's 120 to the CU 110), each RU 120 injects its signal at predetermined time slots. When sector sharing is supported, which will be described later, a time slot in FIG. 3 may carry a common signal destined for multiple RU's in the forward link and may carry a combined signal from multiple RU's in the reverse link.

Some time slots can be reserved for control signals. These control signals can be used, for example, to control a RU 120, to download SW loads to a RU 120, for a RU 120 to report its status such as alarm, to transfer various logs, and/or the like. TDM and/or WDM schemes can be used to reserve certain time slots for each RU 120, or some type of contention and/or reservation based scheme can be used.

The use of a CU 110 and a RU 120 to divide BS functions also enables backhaul aggregation. Since a CU 110 does not need to reside at a cell site, multiple CUs 110 can be collocated at a central location. In this case, the backhaul from CU's 110 to a BSC can be aggregated to save backhaul costs. For example, if each CU 110 needs 4 T1 lines and if there are two CU's 110, embodiments employing less than 8 T1 lines can support the combined backhaul traffic using statistical multiplexing. This can save backhaul cost for the operation of the equipment.

The use of a CU 110 and a RU 120 to divide BS functions also enables sector sharing. As described above, a RE element 310 can comprise a RF subsystem in a RU 120 supporting one carrier in one sector. As illustrated in FIG. 3, the number of RE's 310 can be different from RU 120 to RU120. Each SE in a CU 110 is configured to communicate with a subset of one or more RE's 310 within one RU 120 or across multiple RU's 120. In one embodiment, one RE 310 is attached to only one SE. However, one SE can support multiple RE's 310.

When multiple RE's 310 are attached to a SE, they share the capacity of the SE. Techniques on how to share the capacity are described in more detail below. Depending on how the RE's 310 share the capacity, the combined throughput in all RE's 310 could be actually higher, unchanged or even lower than the original (i.e., non sector-sharing case) capacity.

Forward link signals from a SE is distributed to RE's 310 associated with the SE by either broadcasting (e.g., same signal goes to the RE's 310), switched (e.g., signal goes to only one of the RE's 310 at a time where the MS to receive the signal is), or weighted (e.g., each RE receives optimally weighted signal to maximize the received signal quality for the MS). If the forward link employs TDM, then it carries only one user's signal at a time. In this case, the above switching or combining is performed using a per time slot basis. If the forward link employs CDM, FDM, or OFDM, then it can carry signals of multiple users at the same time. In this case, switching or weighting can be set differently per user depending on the user's channel condition.

If the forward link employs TDM and if a broadcasting method is used, then there is no capacity gain. If the forward link employs TDM or CDM and if a switching method is used, then inter-sector interference is reduced, which in turn increases capacity in neighbor sectors. If the forward link employs CDM and if a weighting method is used, then some capacity gain is also possible.

When the switching method is used, one needs to know the RU 120 to which the MS belongs to direct the signal to the RU 120 only. This location estimation can be done by using one or more of the following methods:

If reverse link signals from RU's 120 are transmitted independently to the CU 110 (as described in more detail below):
a. By detecting a user's received signal energy from each RU 120.

If reverse link signals from RU's 120 are combined before processed at the modem (as described in more detail below):
a. From the route update message from the MS, find out neighbor sectors (assuming a CDMA system) and use this set of neighbors to figure out which RU 120 the MS is closest to.
b. Try all RU's 120 (by sending the user's forward link signals to one RU 120 at a time and by cycling through all RU's 120) and detect the response signal from the MS (assuming the MS sends such signal (e.g., ACK)).
c. By using the inherent difference in optical delay (assuming the amount of optical delays from/to each RU 120 is distinguishable).
d. By using GPS location information from the MS (if the MS has one).

In some embodiments, one RE 310 is attached to one transmit antenna, but multiple transmit antennas can be used for beam forming or for distributed antenna. Principles of sharing forward link capacity can be generalized to multiple transmit antennas.

Similar principles can be used for processing reverse link signals from RE's 310. One or more receive antennas can be used per RE 310, where multiple antennas are used to provide spatial diversity. In one embodiment, signals from multiple antennas are transmitted to the SE separately so that optimal combining of signals can be done at the SE.

When multiple RE's 310 are attached to a SE, signals from each RE 310 need to be transmitted separately from signals from other RE's 310 to the modem and demodulated and decoded at the modem to achieve maximum capacity. Each user's signals, if received by multiple RU's 120, can be combined optimally at the modem. If RU's 120 are isolated (e.g., in a RF sense), then each user's signal arrives at only one RU 120. The modem needs to know which RU 120 carries a user's signal and use the signal to decode it, which can be achieved by detecting received energy from the user. If RU's 120 are not isolated, then a user's signal can arrive at multiple RU's 120. In this case, the modem needs to know the amplitude, phase, and delay of each signal from the RU's 120 to optimally combine (e.g., maximum ratio combining) multiple signals. For example, when there are two RE's 310 having two antennas, then these four signals can be transmitted to the modem separately so that the modem can optimally combine all four signals. Another example is there are 2 RU's 120, where each RU 120 has one RE 310 and each RE 310 has only single receive antenna. In this case, since there are only 2 independent receive signals, it is best not to add them up and give them independently to the modem chip. For example, most CDMA base station chips have 2 input ports and they used for receive diversity for conventional BSs. These two diversity inputs can be used to support 2 RUs 120 that have only a single receive antenna. There are cases where the number of input ports to a sector element is less than the independent antenna elements. In this case, some of the signals must be added before they are given to the sector element for processing.

If TDMA is used in the reverse link, then the combining operation at the modem can be done on a per time slot basis since only one user's signal is received during a time slot. If a CDMA type system, such as IS-95, CDMA-2000, 1×EV-DO, 1×EV-DV, WCDMA, is used, where multiple users transmit at the same time, then the combining operation needs to be done on a per user basis.

However, due to many constraints, carrying multiple signals to the CU 110 separately is not always possible. For example, when multiple RU's 120 are cascaded (e.g., 120*a*, 120*b*, 120*c*, and 120*d* of FIG. 1), there may not be enough bandwidth in the optical link between the CU 110 and the RU 120*a* to carry all reverse link signals separately. Also there are cases when the number of independent input ports in a modem is fewer than the number of independent input signals. In this case, some reverse link signals need to be combined before going to the modem. Depending on how signals are combined, reverse link capacity can be affected.

When the number of input ports to a sector element is less than the number of independent antennas, then some of the signals can be added at the intermediate RU's (e.g., 120*b* and 120*c*) to save backhaul (e.g., between CU 110 and RU 120*a*) bandwidth without losing anything since it needs to be added anyway at the CU 110 before they are given to the SE.

More antennas can be also used for beam forming in the reverse link. The above argument can be generalized to this case.

The following three examples illustrate how combining reverse link signals affect performance in a CDMA system. In these examples, signals are combined digitally in the base band, but in other embodiments, they also can be combined in analog RF or in analog or digital IF.

Figure 4:
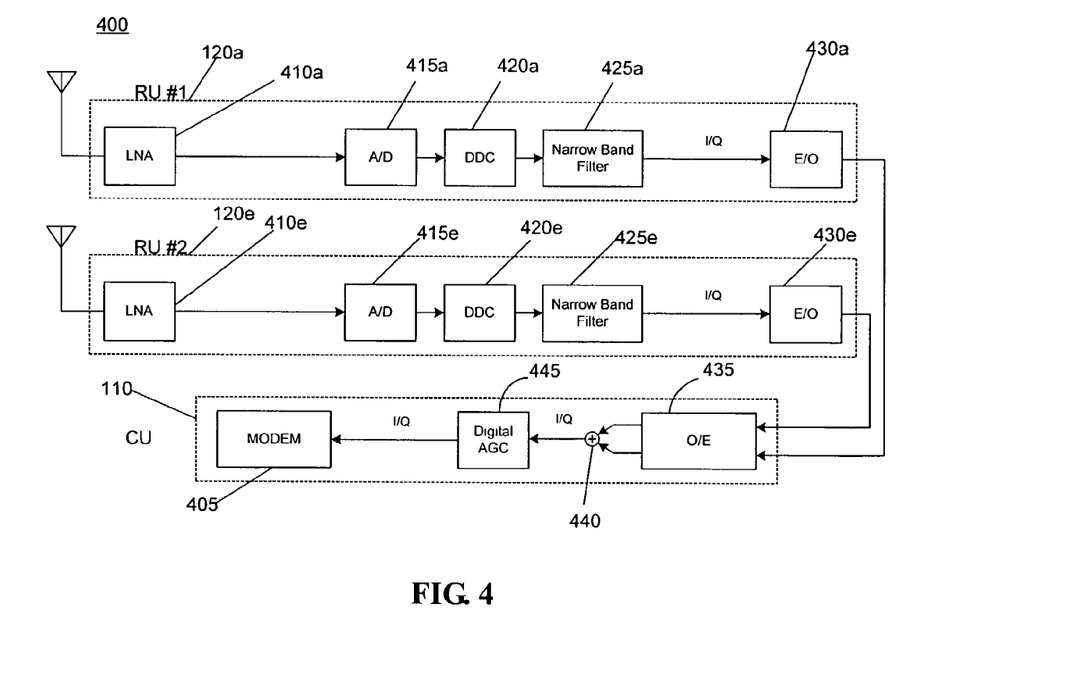
FIG. 4 is a block diagram of another embodiment of a distributed base station.

FIG. 4 shows an example embodiment 400 combining reverse link signals when two single sector/carrier RU's 120*a* and 120*e* are served by one modem 405 in the CU 110. The RU#1 120*a* comprises a LNA 410*a*, an A/D 415*a*, a DDC 420*a*, a narrow band filter 425*a*, and an E/O 430*a*. The RU#2 120*e* comprises a LNA 410*e*, an A/D 415*e*, a DDC 420*e*, a narrow band filter 425*e*, and an E/O 430*e*. The CU 110 comprises an O/E 435, a summer 440, a digital AGC 445, and the modem 405.

In this example, the modem 405 takes only one baseband input signal (e.g., I and Q), which is enough for one receive antenna system. Each RU (120*a* and 120*e*) has one RE and each RE has one receive antenna. In this configuration, each RU (120*a* and 120*e*) contains a typical RF chain. For clarity, FIG. 4 shows the reverse link path only and does not show some components such as IF stages, SAW filters, and the like. The transmission between RU's 120*a* and 120*e* and CU 110 comprises an optical transmission medium and all other signals are assumed to be electrical. Multiple optical signals for the RU's 120*a* and 120*e* can be carried over a single optical fiber by using TDM or WDM.

When signals are combined before processed at the modem 405 as illustrated in FIG. 4, the gain of the RU's 120*a* and 120*e* are equalized to balance the effective noise figure of each RU (120*a* and 120*e*), as described in more detail below. If gains fluctuate over time, then the coverage area of each RU (120*a* and 120*e*) can also change.

In the combining scheme of FIG. 4, the effective noise figure is increased by N (assuming gains of RU's (120*a* and 120*e*) are matched), where N is the number of RU's sharing a modem. In case of CDMA, the pole capacity of the modem 405 is not affected by sharing and is flexibly shared among RU's 120*a* and 120*e*. In other words, the maximum number of users in RU's is limited by the pole capacity but there is no additional per-RU limit on the number of users.

Figure 5:
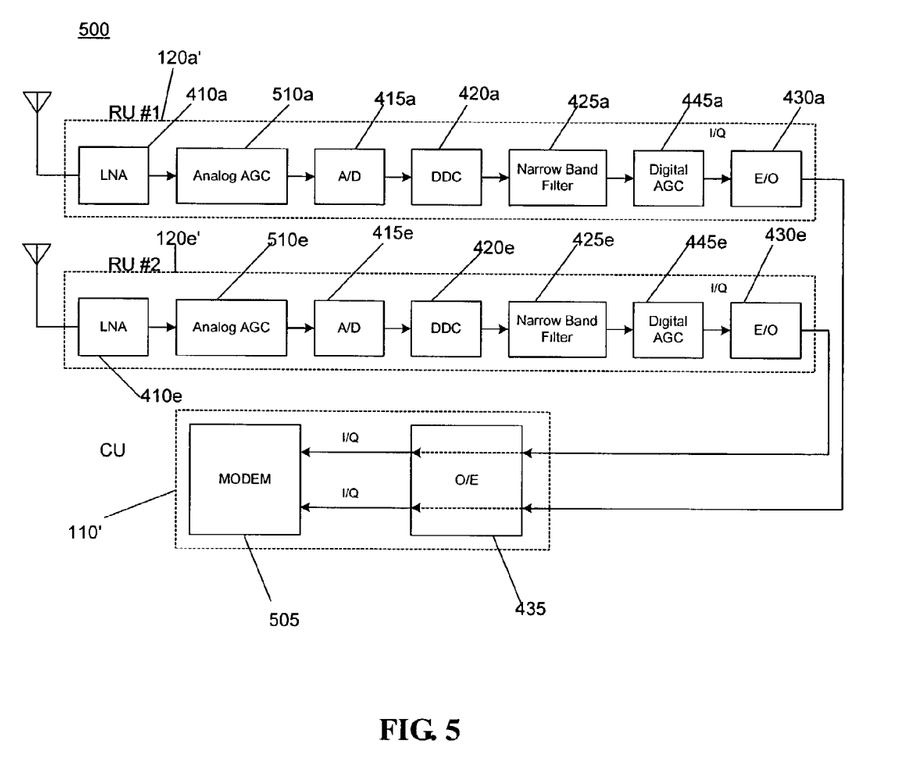
FIG. 5 is a block diagram of another embodiment of a distributed base station.

FIG. 5 illustrates an embodiment 500 representing a combining scheme where the signals are combined at the modem 505. Optimal combining of reverse link signals can be achieved at the modem 505, but it requires signals from each RU 120*a*′ and 120*e*′ to be transmitted to the modem 505 separately as shown. The RU#1 120*a*′ comprises a LNA 410*a*, an analog AGC 510*a*, an A/D 415*a*, a DDC 420*a*, a narrow band filter 425*a*, a digital AGC 445*a*, and an E/O 430*a*. The RU#2 120*e* comprises a LNA 410*e*, an analog AGC 510*e*, an A/D 415*e*, a DDC 420*e*, a narrow band filter 425*e*, a digital AGC 445*e*, and an E/O 430*e*. The CU 110′ comprises an O/E 435, and the modem 505. Including the AGC's 510 and 445 in each RU (120*a*′ and 120*e*′) minimizes the transmission bandwidth in this case.

When there is a user in RU #1 120*a*′ and if the two RU's 120*a*′ and 120*e*′ are 100% isolated (i.e., none of the user's signal is received by RU #2 120*e*′), the modem 505 decodes its signal from the signals from RU #1 120*a*′ only. If the two RU's 120*a*′ and 120*e*′ are not isolated, optimal combining such as maximum ratio combining can be used to combine two signals.

In this scheme 500, gain compensation is not necessary and there is no increase in the effective noise figure. Furthermore, by having more input ports at the modem 505, the pole capacity (in case of CDMA) increases almost linearly in the number of inputs.

More flexibility is obtained by mixing the above two combining schemes of FIG. 4 and FIG. 5. When the total number of output signals (or the total number of antennas) at RE's 310 sharing a modem capacity is greater than the number of input ports at the modem (e.g., 405 or 505), some signals need to be combined. For example, if the modem has 4 input ports and there are 3 RE's 310 each having two antennas, then one can send one RE's 310 signal whose capacity demand is the highest to the modem directly and send combined signals from the other two RE's 310 to the modem. As a fully flexible configuration, one or more subsets of multiple signals in all RE's 310 are chosen (e.g., based on estimated amount of traffic in each RE 310) and the signals in each subset are combined before the modem, which can be changed dynamically as the traffic patterns change over time.

The sector sharing combining schemes above can be enhanced by introducing gain compensation techniques. The combining scheme 400 of FIG. 4 adds multiple signals that are not AGC'd, and so reverse link signals from each RU 120*a* and 120*e* can arrive at the CU 110 with different power, even when the received power at the antenna is the same, due to gain variation in the components in the RU's 120*a* and 120*e*. This can cause imbalance between the RU's 120*a* and 120*e*, which can result in undesired changes in cell sizes, variation in transmission power of mobiles, and other like changes.

There are at least two open-loop techniques to reduce the gain variation per temperature on top of unit-to-unit variation compensation by gain measuring in the field or manufacturing. One technique employs a calibration table. The calibration table that lists a gain compensation value for each temperature is given to each RU 120 and, based on a temperature measurement, the gain is compensated per the table. Another technique employs a thermodpad, which installs a temperature dependent variable loss (gain).

Figure 6:
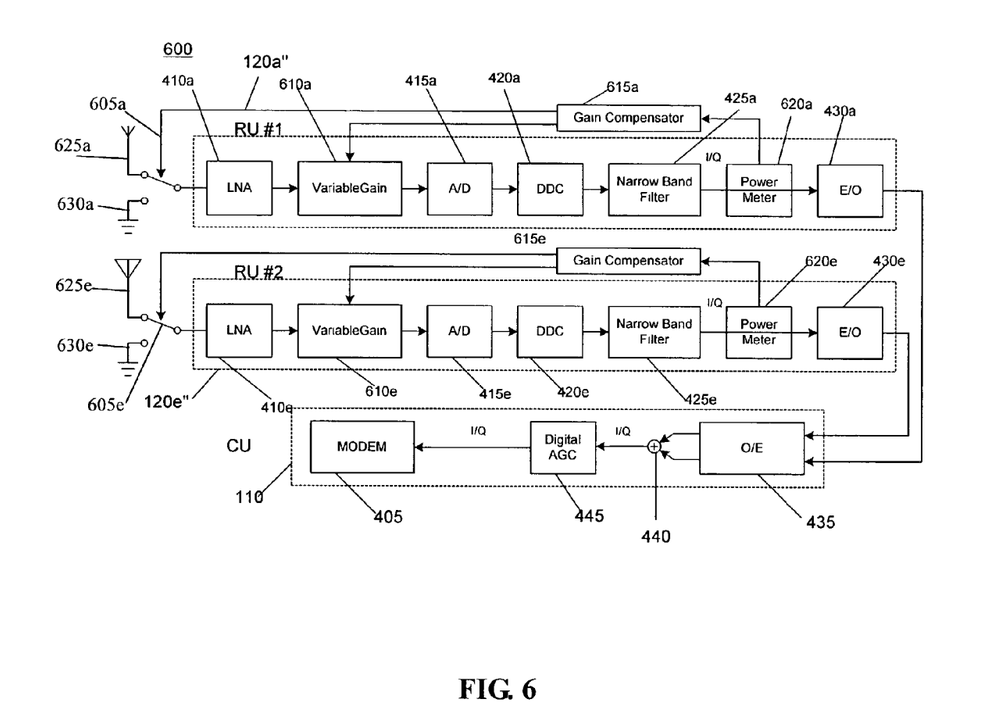
FIG. 6 is a block diagram of another embodiment of a distributed base station.

FIG. 6 illustrates an embodiment 600 that shows how a closed-loop gain compensation technique can be added to the combining scheme 400 of FIG. 4. Like FIG. 4, the RU#1 120*a*″ of FIG. 6 comprises a LNA 410*a*, an A/D 415*a*, a DDC 420*a*, a narrow band filter 425*a*, and an E/O 430*a*. The RU#1 120*a*″ also includes a switch 605*a*, a variable gain 610*a*, a gain compensator 615*a*, and a power meter 620*a*. Similarly, the RU#2 120*e*″ comprises a LNA 410*e*, an A/D 415*e*, a DDC 420*e*, a narrow band filter 425*e*, an E/O 430*e*, a switch 605*e*, a variable gain 610*e*, a gain compensator 615*e*, and a power meter 620*e*. The CU 110 comprises an O/E 435, a summer 440, a digital AGC 445, and the modem 405.

The gain compensator 615 regulates the overall gain in the analog chain to compensate the overall gain for gain variation due to temperature, carrier frequency, and unit-to-unit variations. This gain variation can also change slowly over time (e.g., time dependent temperature variation).

One way to achieve this closed-loop regulation is to use the (amplified) thermal noise after the narrow band filter 425 as a reference. During this measurement, the gain compensator 615 commands the front-end switch 605 to disconnect the signal from the antenna 625 and to connect the LNA input 410 to the ground 630 through a resistor (not shown). The thermal noise power itself can vary linearly as the temperature changes, which can be as high as about 1 dB (this corresponds to a change of temperature from 0 degree Celsius to 70 degree Celsius). The thermal noise can be considered practically a constant.

Alternatively, the system can connect the LNA input 410 to the output of a signal generator (not shown) during the measurement period whose output power is constant and known. For this to work properly, the output power of the signal needs to be much stronger than the thermal noise. For this reason, this method is more intrusive than the above method based on measuring thermal noise.

In another embodiment, if the system can force all MS's to become silent (e.g., turning off their transmitters) during predetermined time intervals (e.g., a few milliseconds every 10 minutes), then it is possible to measure amplified thermal noise without having to have the switch 605.

The measurement period should be as short as possible not to disrupt the demodulation of reverse link signal. This measurement can be done periodically, for example once every 10 minutes.

Once the thermal noise is measured, a negative feed back control (with a large time constant) adjusts the variable gain 610 in front of the A/D 415 by using the difference between the measured thermal noise and a preset target noise value so that the measured noise level is maintained to be near the target value.

Another technique to enhance the utilization of a system employing a CU 110 and RU's 120 is the use of delay compensation. In a CDMA system, such as IS-95, CDMA-2000, 1×EV-DO, 1×EV-DV, where base stations are synchronized to GPS timing, excessive delay between a CU 110 and a RU 120 can be a problem. To reduce the possibility of confusion in timing between the signal transmitted from the RU 120 and the signal transmitted from another nearby sector, signals can be transmitted in advance (i.e., also referred to as Timing Advance) to compensate for the delay in the optical link so that the signal is transmitted at the antenna of the RU 120 at the correct timing.

Since two RUs 120 sharing a sector capacity (regardless of the combining scheme) can sit at quite a different distance from a CU 110, if the MS can see signals from both RUs 120, the signals can have a big time difference of arrival and can look like a multipath with big delay spread. The MS can be configured to take advantage of both signals by setting SearchWindow size to a big number from the AN side using Attribute and/or Message. However, big SearchWindow size degrades performance, since the MS spends a lot of time to search one PN and therefore will be able to search less PNs per a given time period. This may not be a problem if enough time is allowed to search pilots, but the latency could lead to performance degradation. The same problem exists for Reverse Link and one way to solve the problem is to increase SearchWindow size for both the access channel and the traffic channel of the sector.

Depending on RF environment and coverage of each RU 120, it is sometimes desirable to delay forward and/or reverse link signals at some of the RU's 120 to reduce timing difference between RU's 120. This helps reduce delay spread, search window size (to search for multipath signals), possibility of confusion with signals from other nearby sectors.

Figure 7:
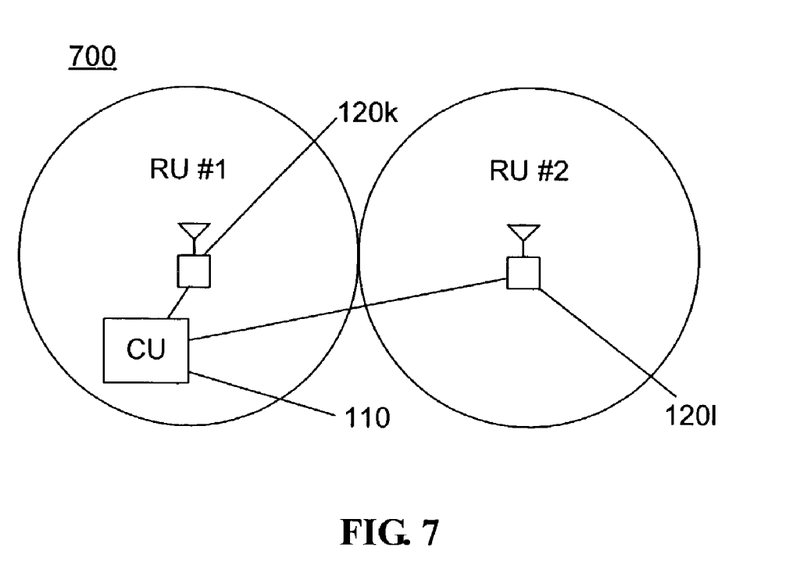
FIG. 7 is a block diagram of another embodiment of a distributed base station.

For example, FIG. 7 illustrates an embodiment 700 where two RU's 120k and 120l with equal transmit power are sharing a modem capacity in the CU 110 and the RU #1 120k is close to the CU 110 and the RU #2 120l is far from the CU 110. In this case, if the system introduces delay (e.g., the same amount in both the forward and the reverse links) in the RU #1 120k to equalize the delay from the CU 110 to the RU's 120k and 120l, then the delay spread experienced by the user at the boundary will be minimized. In this case, "Timing Advance" can be set to make the signal at the antenna of either RU #1 120k or #2 120l (equivalent since delay is equalized) aligned to the PN offset of the modem. Note that this may not be possible with conventional repeaters since the repeated signal is taken from the transmit antenna of the macro cell BS.

Figure 8:
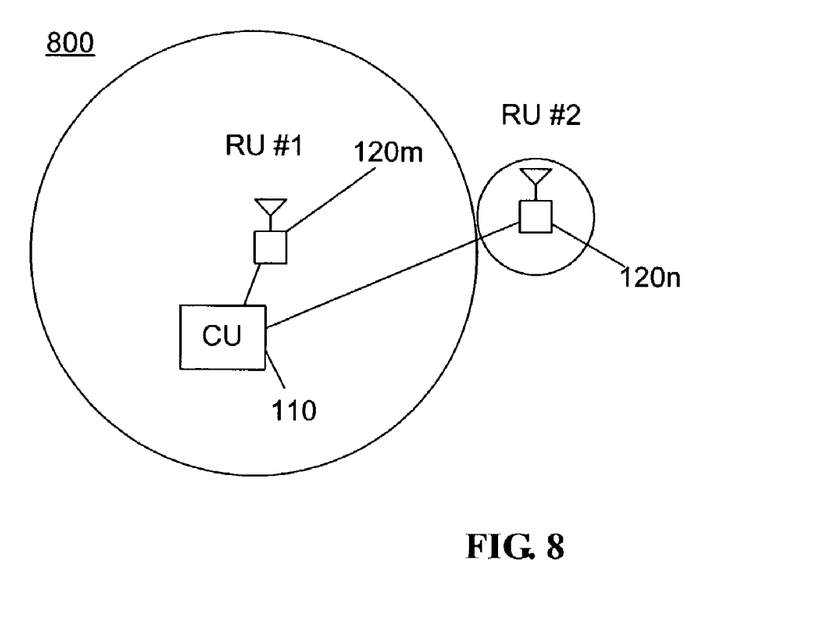
FIG. 8 is a block diagram of another embodiment of a distributed base station.

As another example, FIG. 8 illustrates an embodiment 800 similar to the situation as above, but now assume RU #1's 120m transmit power is much stronger than that of the RU #2 120n. In this case, the coverage of RU #2 120n is smaller as shown in FIG. 8. If the delay difference between two optical links is the same as the over the air delay from the RU #1 120m to the boundary, then the system does not introduce any additional delay, since adding delay will only increase the delay spread experienced by users at the cell boundary. The "Timing Advance" needs to be set for RU #1 120m. In other words, the signal leaving at the antenna of RU #1 120m is aligned to the correct reference timing.

In general, the amount of delay compensation should be optimized depending on many factors such as cell sizes, PN offsets, RF environment, and/or the like.

A number of embodiments of the invention have been described. Nevertheless, it will be understood that various modifications may be made without departing from the spirit and scope of the invention. Accordingly, other embodiments are within the scope of the following claims.

What is claimed is:

1. A distributed base station comprising:
   a central unit having one or more modems, each modem including one or more input ports;
   remote units, at least one of the remote units in communication with the central unit via a transmission medium, the remote units each having one or more RF elements, each RF element having one or more receive antennas;
   one or more combining modules configured to select one or more subsets of reverse link signals from the RF elements to be combined before each input port of the modem, wherein RF elements of at least two remote units share a reverse link capacity of at least one of the modems; and
   a gain compensation module configured to equalize link gains of signal paths associated with the selected subsets of reverse link signals prior to the selected subsets of reverse link signals being combined by the one or more combining modules.

2. The base station of claim 1 wherein the gain compensation module is further configured to employ a temperature dependent variable gain device.

3. The base station of claim 1 wherein the gain compensation module is further configured to measure an amplified signal power while a test signal is injected at an input of a first RF element.

4. The base station of claim 3 further comprising a test device configured to generate the test signal, wherein the amplified signal power is constant.

5. The base station of claim 3 further comprising a switch configured to disconnect the input from an associated antenna and to connect the input to a first end of a resistor with its second end connected to a ground reference.

6. The base station of claim 5 wherein the test signal comprises thermal noise across the resistor.

7. The base station of claim 1 wherein the combining module is further configured to dynamically change the mapping from the subsets of signals to each modem input port based on changes to the estimated loading in each RF element.

8. The base station of claim 1 wherein the RF elements sharing the reverse link capacity of at least one of the modems are changed dynamically as an estimated loading in each RF element changes.

9. The base station of claim 1 wherein timing advance is used to compensate for transmission delay from the central unit to a first RF element that is not sharing.

10. The base station of claim 1 wherein timing advance is used to compensate for transmission delay from the central unit to a RF element farthest from the central unit that is sharing the reverse link capacity of at least one of the modems with other RF elements and delay compensation is used in other RF elements to equalize forward and reverse link delays.

11. The base station of claim 1 wherein optimal delay compensation and timing advance are used as a function of cell size and RF environment in RF elements sharing the reverse link capacity of at least one of the modems.

12. The base station of claim 1 wherein at least a portion of the remote units are cascaded.

13. The base station of claim 12 wherein cascading is done by TDM.

14. The base station of claim 12 wherein at least a portion of signals are combined at remote units.

15. The base station of claim 1 wherein at least a portion of signals are combined at the central unit.

16. The base station of claim 1 wherein signals transmitted between the central unit and a first remote unit are analog or digital base band signals.

17. The base station of claim 1 wherein signals transmitted between the central unit and a first remote unit are analog or digital IF signals.

18. The base station of claim 1 wherein signals transmitted between the central unit and a first remote unit are RF signals.

19. The base station of claim 1 wherein at least a portion of the RF elements support beam forming.

* * * * *